United States Patent Office 3,416,017
Patented Dec. 10, 1968

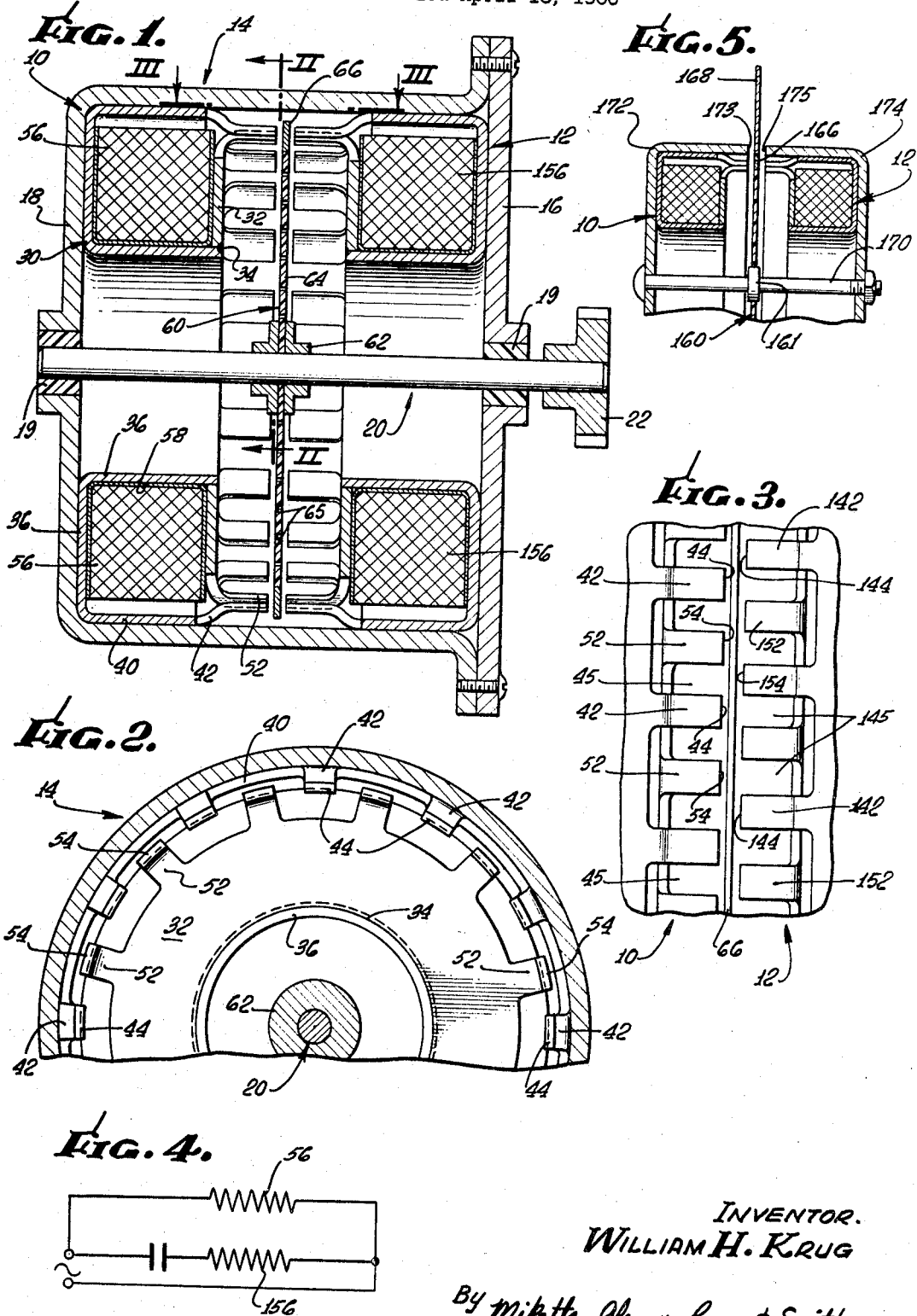

3,416,017
SELF-STARTING SYNCHRONOUS MOTOR
William H. Krug, Van Nuys, Calif.
(1221 Jerome Ave., Janesville, Wis. 53545)
Filed Apr. 18, 1966, Ser. No. 543,317
6 Claims. (Cl. 310—164)

The present invention relates generally to electric motors of the synchronous type, and contemplates a motor having an output of the order of a millihorsepower or less such as may be used for driving a clock or similar timing device, as well as, in somewhat larger sizes, for driving record player turntables and for other similar applications requiring appreciable, although small, amounts of power.

In general, the present invention contemplates the provision of stator means in the form of a pair of axially spaced flux-generating assemblies, each of the assemblies including a plurality of polefaces spaced by equal arcuate intervals in annular relationship concentric with the motor axis. The polefaces are disposed in a pair of planes perpendicular to the motor axis, and the polefaces of each assembly alternate as to magnetic polarity when the winding is electrically energized. The motor includes a disk having an annular rotor of high retentivity disposed in airgap relation between the planes of the poleface annuli of the two flux-generating assemblies. The radially inner portion of the disk, supporting the rotor proper, is desirably of material such as nylon which is neither magnetically conductive or electrically conductive and which is light in weight. The disk is mounted for rotation relative to the stator means, as by being mounted upon a shaft journaled in suitable bearings in a housing retaining the stator means in assembled relation. The rotational output power of the shaft may then be fed through conventional gear reduction drives or the like to the external load, such as the hands of a clock. The construction herein contemplated permits the rotor disk to be extended radially outwardly if desired, whereby the portion of the disk outwardly of the rotor may constitute the output element, as in stroboscopic applications or the like.

The polefaces of one of the stator assemblies are in longitudinal alignment with the intervals between the polefaces of the other of such assemblies. The windings of the two assemblies are energized by currents which differ by 90° in phase. As will be understood, this arrangement provides for self-starting of the motor, in a direction determined by the polarity relationships between the polefaces of the two assemblies. Conventional reverse switching means may be incorporated in the circuitry energizing one of the windings, whereby the direction of rotation may be selected by the user. The currents in 90° phase relationship may be supplied from a two-phase source, or may be produced from a single phase source by the use of a capacitor in the circuit supplying one of the windings, as is well-known in the art. Any conventional industrial frequency may be used, such as 60 c.p.s., and higher frequencies such as 400 c.p.s. or higher are also usable. The supply frequency and the number of pairs of stator poles determines the synchronous speed, as is well known in the art.

Accordingly, it is a principal object of the present invention to provide and disclose a novel form of self-starting synchronous motor of the hysteresis type. Other objects and purposes of the invention are to provide, in such a motor, a pair of flux-generating assemblies having magnetic cores of novel design, whereby to minimize leakage flux and reluctance of the flux path and thereby to use most efficiently the electric power supplied to the motor; to provide, in such a motor, a pair of annular sets of polefaces displaced inwardly from the casing or housing containing the component parts of the motor; to provide, in such a motor, an arrangement of parts whereby the radius of the rotatable element outwardly of the rotor proper may be increased to any reasonable dimension desired for a particular application; and for other and additional objects and purposes as will be understood from the following description of preferred embodiments of the invention taken in connection with the accompanying drawings in which:

FIG. 1 is a vertical sectional view of a motor embodying the present invention.

FIG. 2 is a sectional view taken on arrows II—II of FIG. 1.

FIG. 3 is a fragmentary developed view taken on arrows III—III of FIG. 1.

FIG. 4 is a schematic wiring diagram of the circuitry and windings of the motor.

FIG. 5 is a fragmentary vertical sectional view showing an alternative form of the invention.

Referring in detail to the drawings, an illustrative form of the present motor includes a pair of flux generating assemblies or stators indicated generally at 10 and 12, retained in a cup shaped housing indicated generally at 14 having a removable cover plate 16 at one end. The circular base 18 of the housing and cover plate 16 are each provided with bearing means 19 for rotatably mounting a shaft indicated generally at 20 desirably provided with means such as output gear 22 for delivering power to an external load.

Each stator includes a generally toroidal core of magnetic material substantially surrounding an annular winding, the core being desirably made of sheet metal of high permeability having a thickness of between about 10 and 25 mils. Thus the core of stator 10 may include a major element indicated generally at 30 and an annular face plate 32 magnetically fixed as by weld 34 along its inner circumference to the inner wall 36 of core element 30. The latter includes an annular end wall 38 and an outer wall 40 having formed therein a purality of arcuately spaced portions constituting polepieces projecting generally concentrically of shaft 20 and terminating in equally angularly spaced polefaces disposed in an annulus normal to the shaft axis. Thus outer wall 40 has formed therein polepiece 42 terminating in poleface 44.

At the other end of the stator core magnetic path, face plate 32 is formed to provide a plurality of portions projecting generally concentrically of the shaft axis and constituting polepieces equal in number to the polepieces first described and terminating in polefaces disposed in the annulus of poleface 44. Thus face plate 32 includes polepiece 52 terminating in poleface 54. It will be noted that polepiece 52 is disposed radially inwardly from the cylindrical wall of housing 14, so that if the latter is made of magnetic material, it will not effectively short-circuit the magnetic path of the stator.

Stator assembly 10 includes an annular winding 56 which may be wound on bobbin 58, housed within the generally toroidal space defined by stator core parts 30 and 32.

Flux generating assembly or stator 12 is constructed similarly to stator 10 above described, and its polepieces 142 and 152 terminate in polefaces 144 and 154 lying in a common annulus concentric with the annulus containing polefaces 44 and 54.

A disk indicated generally at 60 is fixed to shaft 20 as by means 62 and includes a support portion or spider 64 surrounded by an annular portion 66 of material of high retentivity constituting the rotor proper. The rotor 66 is disposed equidistantly between the poleface annuli and in airgap relation with the polefaces. Spider 64 is of non-magnetic, non-conductive material of light weight such as nylon, and may be perforated as at 65 to further lighten it.

As best understood by reference to the developed view of FIG. 3, the two stators are positioned relative to one another so that the polefaces of one are aligned with the arcuate intervals between polefaces of the other. Thus polefaces 44 and 54 of stator 10 are aligned with arcuate intervals 145 between polefaces of stator 12, and polefaces 144 and 154 of stator 12 are aligned with arcuate intervals 45 between polefaces of stator 10. In the present form of the invention, as most clearly appears in FIG. 2, each stator has twelve pairs of poles, so the pitch between polefaces of the same polarity at any instant is 30°. Consequently, the stagger or misalignment between the polefaces of one stator and those of the other is 7½°.

Windings 56 and 156 of stators 10 and 12 are energized by currents in 90° phase relation, either by a two phase supply or by well known excitation circuitry as illustrated in FIG. 4 producing two phase excitation from a single phase source.

An alternative form of the invention is illustrated in FIG. 5, wherein annular means may be provided extending outwardly of the annular portion 166 constituting the magnetically operative portion of the rotor disk. Thus the disk indicated generally at 160 is rotatably mounted at 161 on a central through bolt 170. The housing includes a pair of cup shaped members 172 and 174 each receiving one of the stator assemblies 10 and 12 therein. The housing members are held in assembled relation by bolt 170, and their adjacent circular edges 173 and 175 are axially spaced apart as shown.

Extending outwardly from the rotor proper 166 is an annular member 168 desirably of thin material of light weight such as aluminum or the like. It need not be, but may be, magnetically or electrically conductive, and is available for use in appropriate applications.

When the outer housing 14 or 172 and 174 are of magnetic material, it will be seen that the polepieces 52 and 152 must be spaced therefrom to prevent a magnetic short circuit, desirably by a distance large relative to the existing airgaps. Thus when the airgap between a poleface and rotor 66 is about 3 or 4 mils, as is desirable, the total airgap is about 6 or 8 mils. The radial spacing of polepieces 52 and 152 should then be at least approximately 20 mils and desirably more, perhaps 50 mils.

I claim:
1. An electric motor comprising:
a pair of axially spaced, annular flux generating assemblies, each including an annular winding and a generally toroidal core of magnetic material substantially surrounding the winding, the core including circumferentially spaced polepieces terminating in equally angularly spaced polefaces disposed in an annulus in a plane normal to said axis, successive polefaces being of opposite magnetic polarity when the winding is energized and being spaced apart by equal arcuate intervals, the polepieces of each assembly extending concentrically toward the other and the polefaces of one being aligned with the arcuate intervals of the other;
a disk including an annular rotor of high retentivity mounted for rotation between said poleface annuli and in airgap relation therein;
and means for energizing said windings with currents in 90° phase relation.

2. The invention as stated in claim 1 including a cup-shaped housing for mounting said assemblies therein and cover means closing the open end of the housing, and a shaft rotatably carried by the housing and cover means, the disk being fixed to the shaft.

3. The invention as stated in claim 2 wherein said housing is of magnetic material and said poleface annuli are spaced inwardly out of effective magnetic relation with the housing.

4. The invention as stated in claim 1 including housing means comprising a pair of oppositely disposed cup-shaped members mounted in coaxial alignment, each receiving one of said assemblies therein, and means retaining said members in assembled relation.

5. The invention as stated in claim 4 wherein said housing members are of magnetic material and said poleface annuli are spaced inwardly out of effective magnetic relation with the housing members.

6. The invention as stated in claim 4 wherein the open ends of the housing members are spaced apart and the disk is provided with annular means extending radially outwardly from the rotor through the space between said open ends.

References Cited
UNITED STATES PATENTS

| 2,070,447 | 2/1937 | Morrill | 310—164 |
|---|---|---|---|
| 2,081,993 | 6/1937 | Gebhardt | 310—164 |
| 2,122,307 | 6/1938 | Welch | 310—164 |
| 2,553,760 | 5/1951 | Gille | 310—164 |
| 2,814,746 | 11/1957 | Boerdijk | 310—164 |

MILTON O. HIRSHFIELD, *Primary Examiner.*

L. L. SMITH, *Assistant Examiner.*

U.S. Cl. X.R.
310—41